United States Patent
Hong et al.

(10) Patent No.: US 9,661,296 B2
(45) Date of Patent: May 23, 2017

(54) IMAGE PROCESSING APPARATUS AND METHOD

(71) Applicant: SAMSUNG ELECTRONICS CO., LTD., Suwon-si, Gyeonggi-do (KR)

(72) Inventors: Ji Young Hong, Seongnam-si (KR); Yang Ho Cho, Seongnam-si (KR); Ho Young Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 13/940,456

(22) Filed: Jul. 12, 2013

(65) Prior Publication Data

US 2014/0015830 A1 Jan. 16, 2014

Related U.S. Application Data

(60) Provisional application No. 61/670,830, filed on Jul. 12, 2012.

(30) Foreign Application Priority Data

Nov. 20, 2012 (KR) .................. 10-2012-0131505

(51) Int. Cl.
  *G06T 15/00* (2011.01)
  *H04N 13/00* (2006.01)
  *G06T 5/10* (2006.01)

(52) U.S. Cl.
  CPC ........... *H04N 13/0022* (2013.01); *G06T 5/10* (2013.01)

(58) Field of Classification Search
  CPC ........... H04N 13/0022; H04N 13/0497; H04N 2013/0081; G06T 5/008; G06T 5/10; G06T 7/0051; G06T 7/0075; G06T 2207/10028; G06T 2207/10021
  USPC ......................... 345/419, 420, 422
  See application file for complete search history.

(56) References Cited

U.S. PATENT DOCUMENTS

| | | | |
|---|---|---|---|
| 6,269,175 B1 * | 7/2001 | Hanna ...................... | G06T 5/50 |
| | | | 348/E13.014 |
| 6,490,364 B2 * | 12/2002 | Hanna ...................... | G06T 5/50 |
| | | | 348/E13.014 |
| 7,340,094 B2 * | 3/2008 | Mayhew ............... | G06T 7/0071 |
| | | | 348/E5.058 |
| 7,557,824 B2 | 7/2009 | Holliman ...................... | 348/46 |

(Continued)

FOREIGN PATENT DOCUMENTS

| CN | 101542529 A | 9/2009 |
|---|---|---|
| CN | 101651772 A | 2/2010 |

(Continued)

OTHER PUBLICATIONS

Chinese Office Action issued on Jan. 15, 2016 in counterpart Chinese Patent Application No. 201310292218.4 (15 pages in English; 10 pages in Chinese).

*Primary Examiner* — Phu K Nguyen
(74) *Attorney, Agent, or Firm* — NSIP Law

(57) ABSTRACT

Provided is an image processing method and apparatus, the apparatus including an object separation unit to separate an object region from a background region using at least one of a color image and a depth image associated with the color image, a contrast calculating unit to calculate a contrast between the object region and the background region, and a depth adjusting unit to adjust a depth of the depth image based on the calculated contrast.

26 Claims, 8 Drawing Sheets

(56) References Cited

U.S. PATENT DOCUMENTS

| | | | | |
|---|---|---|---|---|
| 7,760,965 B2* | 7/2010 | Tener | ............... | G06T 5/20 |
| | | | | 382/266 |
| 8,000,521 B2* | 8/2011 | Kira | ............... | G02B 27/2228 |
| | | | | 359/462 |
| 8,325,219 B2* | 12/2012 | Era | ............... | H04N 13/0022 |
| | | | | 348/42 |
| 8,630,480 B2* | 1/2014 | Takahashi | ............... | H04N 13/0007 |
| | | | | 382/154 |
| 8,660,337 B2* | 2/2014 | Takahashi | ............... | G06T 5/008 |
| | | | | 382/154 |
| 8,780,113 B1* | 7/2014 | Ciurea | ............... | H04N 13/0022 |
| | | | | 345/427 |
| 8,817,069 B2* | 8/2014 | Alessandrini | ............... | G06T 5/005 |
| | | | | 348/42 |
| 8,885,941 B2* | 11/2014 | Schiller | ............... | G06T 5/003 |
| | | | | 382/180 |
| 9,020,239 B2* | 4/2015 | Graepel | ............... | G06K 9/00355 |
| | | | | 345/419 |
| 9,030,466 B2* | 5/2015 | Uehira | ............... | G01B 11/2545 |
| | | | | 345/419 |
| 9,070,316 B2* | 6/2015 | Verstraete | ............... | G02F 1/133606 |
| 9,077,994 B2* | 7/2015 | Miller | ............... | G06F 3/14 |
| 9,098,907 B2* | 8/2015 | Takahashi | ............... | G06T 5/008 |
| 9,123,117 B2* | 9/2015 | Ciurea | ............... | H04N 13/0022 |
| 9,262,691 B2* | 2/2016 | Kang | ............... | G06K 9/4676 |

FOREIGN PATENT DOCUMENTS

| | | |
|---|---|---|
| CN | 102082954 A | 6/2011 |
| JP | 2012-19399 | 1/2012 |
| JP | 2012-60345 | 3/2012 |
| KR | 10-0812905 | 3/2008 |
| KR | 10-2011-0059531 | 6/2011 |

* cited by examiner

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 1 | 1 | 0 | 0 |
| 0 | 0 | 1 | 1 | 1 | 1 | 1 | 0 |
| 0 | 1 | 1 | 1 | 1 | 1 | 1 | 0 |
| 0 | 0 | 1 | 1 | 1 | 1 | 0 | 0 |
| 0 | 0 | 0 | 0 | 0 | 0 | 0 | 0 |
| 0 | 0 | 0 | 0 | 0 | 0 | 0 | 0 |

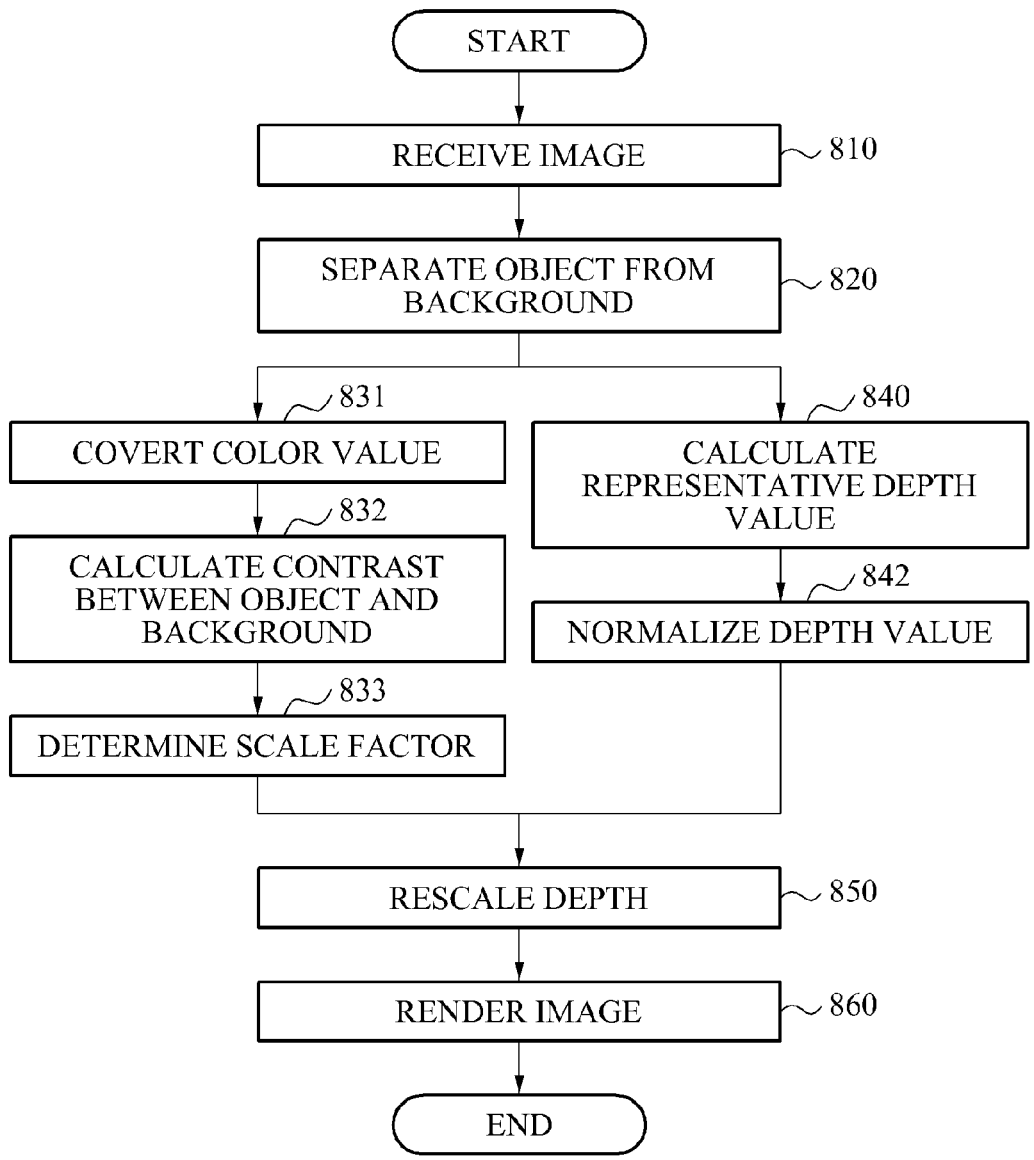

IMAGE PROCESSING APPARATUS AND METHOD

CROSS-REFERENCE TO RELATED APPLICATIONS

This application claims the priority benefit of U.S. Provisional Application No. 61/670,830, filed on Jul. 12, 2012, in the U.S. Patent and Trademark Office, and Korean Patent Application No. 10-2012-0131505, filed on Nov. 20, 2012, in the Korean Intellectual Property Office, the disclosures of which are incorporated herein by reference.

BACKGROUND

1. Field

One or more embodiments relate to an image processing apparatus and method, and more particularly, to an image processing apparatus and method that may adjust a depth for an image.

2. Description of the Related Art

A 3D display may provide a higher sense of reality. However, the provision of such a higher sense of reality with conventional 3D displays may result in a deterioration in image quality or visual fatigue. Accordingly, there is a demand for technology for reducing the visual fatigue while minimizing the quality deterioration of the 3D display.

For example, various methods have been employed to adjust a depth for a conventional 3D display. One such method is proposed in U.S. Pat. No. 7,557,824, entitled "Method and apparatus for generating a stereoscopic image." In particular, U.S. Pat. No. 7,557,824 describes a depth mapping in which a region of interest (ROI) may be obtained using depth information, a viewing distance, and the like, and a depth corresponding to a near/far region may be adjusted based on the obtained ROI.

SUMMARY

One or more embodiments set forth an image processing apparatus, including an object separation unit to separate an object region from a background region based on at least one of a color image and a depth image associated with the color image, a contrast calculating unit to calculate a contrast between the object region and the background region, and a depth adjusting unit to adjust a depth of the depth image based on the calculated contrast.

The object region and the background may be regions of the color image.

The object separation unit may generate a mask map based on the separating of the object region from the background region, and store the mask map in a buffer.

The mask map may be populated with depth representing information of the object region.

The depth adjusting unit may adjusts the depth of the depth image by applying a scale factor to the depth image using the mask map.

The object separation unit may separate the object region from the background region using a visual attention map generated based on human visual perception characteristics.

The object separation unit may separate the object region from the background region using a predetermined region of interest (ROI).

The object separation unit may separate the object region from the background region, by segmenting a level of a depth value using the depth image and removing a horizontal plane using an equation of the horizontal plane.

The contrast calculating unit may further include a color value converting unit to convert a color value of at least one pixel of the color image into a luminance value in which a display characteristic associated with the image processing apparatus is reflected. Here, the image processing apparatus may be a display and the display characteristics may be physical display characteristics of the display.

The color value converting unit may respectively convert one or more color value of one or more pixels into respective luminance values, using a piecewise linear interpolation assuming constant chromaticity coordinates (PLCC) model.

The contrast calculating unit may calculate a first luminance value representing a luminance of the object region and a second luminance value representing a luminance value a luminance of the background region, based on the respective converted luminance values, and calculate the contrast based on a difference between the first luminance value and the second luminance value.

The contrast calculating unit may calculate the contrast by applying the first luminance value and the second luminance value to a determined Michelson contrast.

The depth adjusting unit may further include a depth normalization unit to normalize the depth image, using a maximum depth value to be displayed by a display associated with the image processing apparatus, a scale factor determining unit to determine a scale factor based on the calculated contrast, and a depth rescaling unit to scale a depth value of the depth image based on the scale factor. Here, the image processing apparatus may be the display.

The scale factor may be determined so as to decrease as the contrast increases, using a database constructed by an experiment on a just noticeable difference (JND) with respect to a depth value.

The scale factor determining unit may determine which of predetermined contrast groupings the calculated contrast falls within, so the scale factor determining unit determines which of respectively different predetermined scale factors, set to be respectively applied for each of the predetermined contrast groupings, to apply to the depth value.

The image processing apparatus may further include an image rendering unit to render a three-dimensional (3D) image corresponding to at least one point of view, using the color image and a result of the adjusting of the depth of the depth image by the depth adjusting unit. The image rendering unit may render the 3D image using depth image based rendering (DIBR).

One or more embodiments set forth an image processing method, including separating an object region from a background region using at least one of a color image and a depth image associated with the color image, calculating a contrast between the object region and the background region, and adjusting a depth of the depth image based on the calculated contrast.

The method may further include generating a mask map based on the separating of the object region from the background region, populating the mask map with depth representing information of the object region, and wherein the adjusting of the depth includes applying a scale factor, based on the calculated contrast, to the depth image using the mask map.

The calculating of the contrast may include respectively converting one or more color values of one or more pixels of the color image into respective luminance values in which a display characteristic associated with a display is reflected.

The converting of the color value may include converting the color value of the at least one pixel into the luminance value based on a piecewise linear interpolation assuming constant chromaticity coordinates (PLCC) model, and the calculating of the contrast further may include calculating a first luminance value representing a luminance of the object region and a second luminance value representing a luminance of the background region, based on the respective converted luminance values of the one or more pixels of the color image, and calculating the contrast based on a difference between the first luminance value and the second luminance value.

The adjusting of the depth of the depth image may further include normalizing the depth image based on a maximum depth value to be displayed by a display, determining a scale factor based on the calculated contrast, and scaling a depth value of the depth image based on the determined scale factor.

The scale factor may be determined so as to decrease as the contrast increases, using a database constructed by an experiment on a just noticeable difference (JND) with respect to a depth value.

One or more embodiments set forth a non-transitory computer-readable medium encoded with computer readable code to control at least one processing device to implement an image processing method, the method including separating an object region from a background region based on at least one of a color image and a depth image associated with the color image, calculating a contrast between the object region and the background region, and adjusting a depth of the depth image based on the calculated contrast.

Additional aspects and/or advantages will be set forth in part in the description which follows and, in part, will be apparent from the description, or may be learned by practice of one or more embodiments of the present invention.

BRIEF DESCRIPTION OF THE DRAWINGS

These and/or other aspects will become apparent and more readily appreciated from the following description of embodiments, taken in conjunction with the accompanying drawings of which:

FIG. 4 illustrates a process of separating an object region from a background region and storing the object region and the background region, according to one or more embodiments;

FIG. 8 illustrates an image processing method, according to one or more embodiments.

DETAILED DESCRIPTION

Figure 1:
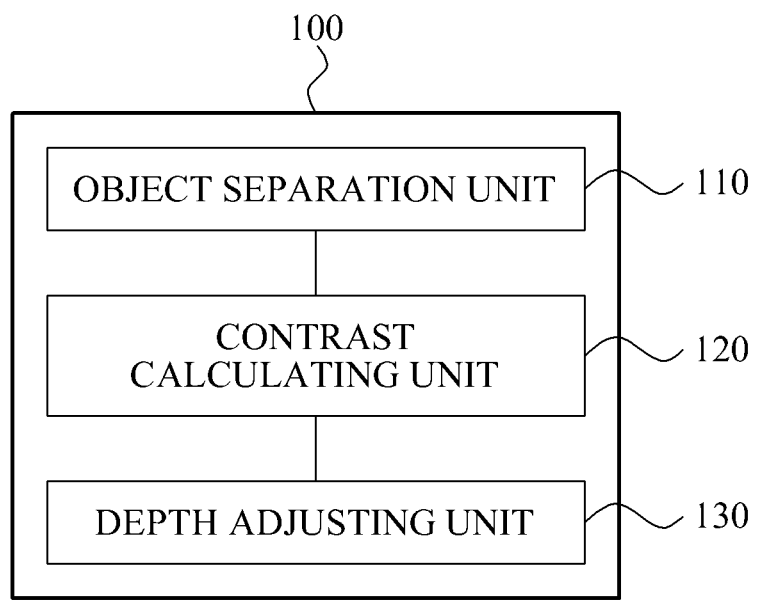
FIG. 1 illustrates an image processing apparatus, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an image processing apparatus 100, according to one or more embodiments.

According to one or more embodiments, an object separation unit 110 of the image processing apparatus 100 may separate an object region from a two-dimensional (2D) or three-dimensional (3D) image from a background region of the 2D or 3D image. As only an example, the 3D image may include a color image and a depth image and the 2D image may include a color image and a corresponding depth image may be input or available for generating such a 3D image.

The object separation unit 110 may separate the object region from the background region using various schemes. As only an example, the object separation unit 110 may distinguish a background from an object, using a visual attention map generated based on human visual perception characteristics. In addition, the object separation unit 110 may separate regions using a region of interest (ROI), as only an example. Further, the object separation unit 110 may separate regions simply using available depth information for the underlying image. Such examples will be described in greater detail with reference to at least FIGS. 2A through 3, which respectively each set forth one or more embodiments.

A contrast calculating unit 120 may calculate a representative luminance value of the separated object region and a representative luminance value of the separated background region, and calculate a contrast corresponding to a difference between the representative luminance value of the object region and the representative luminance value of the background region. As only examples, embodiments of a method of calculating the contrast will be described in greater detail with reference at least to FIGS. 5 and 6, and the like, which respectively each set forth one or more embodiments.

A depth adjusting unit 130 may adjust a depth, e.g., of the 3D image or of the available or input depth image for the 2D image, based on the calculated contrast. The process of adjusting the depth is referred to herein as rescaling.

The depth adjusting unit 130 may adjust the depth of the depth image, using a determined just noticeable difference (JND), among the human visual perception characteristics. Here, the JND may refer to a determined minimum perceivable depth difference based on the corresponding calculated contrast.

A three-dimensional (3D) perception may refer to technology for realizing a sense of reality by combining a theory of perception through a disparity with an empirical theory of perception. In one or more embodiments, such a mechanism for the 3D perception may be based on physiological characteristics of a human sense of sight.

One or more embodiments are based on a theory that a human sense of sight is sensitive to luminance, among the human visual perception characteristics. In one or more embodiments, a contrast of an input image may be calculated using contrast masking, and a JND proved theoretically and/or experimentally with respect to the calculated contrast may be stored in a database. Depending on embodiment, when a contrast between an object region and a background region of an input image is calculated, a depth with respect to the object region and/or the background may be adjusted using such a database.

As only examples, one or more embodiments of a process of adjusting the depth will be described in greater detail with reference to at least FIGS. 5 and 6, which respectively each set forth one or more embodiments.

The image processing apparatus 100 may prevent quality deterioration resulting from well known 'holes', and the like, generated when a depth of a 3D image is adjusted and/or when a two-dimensional (2D) image is converted into a 3D image, and reduce visual fatigue.

Figure 2A:
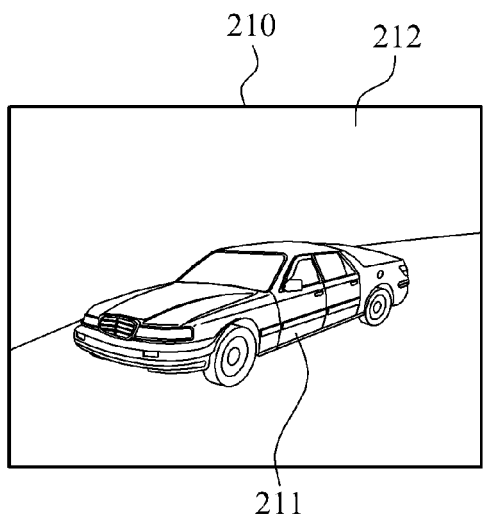
FIGS. 2A and 2B illustrate images that may be provided to an image processing apparatus, according to one or more embodiments.
Figure 2B:
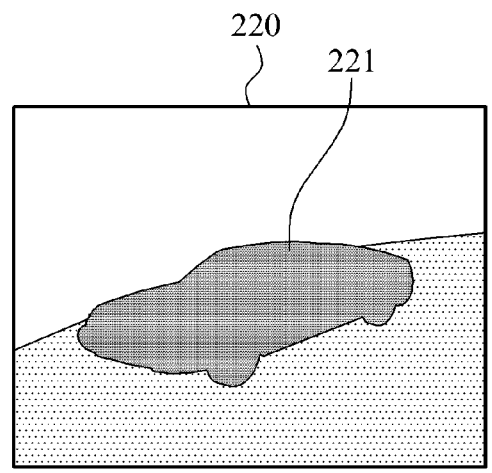

FIGS. 2A and 2B illustrate images that may be provided to an image processing apparatus, according to one or more embodiments.

Referring to FIG. 2A, an input color image 210 may include an object region 211 and a background region 212. As only an example, the input color image 210 may include color values according to a red, green, and blue (RGB) model, noting that alternatives are also available.

Along with the input color image 210, a depth image 220 of FIG. 2B may be available or provided/input. However, the input of the depth image 220 may be provided as only an example, as a disparity map may alternately be input in place of the depth image 220, again as only an example. In this instance, depth adjustment of a depth image may correspond to disparity adjustment of a disparity map.

According to one or more embodiments, another color image of a differing point of view, i.e., differing from a point of view of the input color image 210, may be available or provided/input, in lieu of the depth image 220 or the disparity map. This may be construed as a case in which a stereoscopic image is available or provided/input. In this instance, the depth image 220 or the disparity map may be readily obtained from the stereoscopic image, using a known scheme, noting that alternative approaches of obtaining a depth image or disparity image for the object region and/or background region are also available.

Accordingly, hereinafter, although a process of adjusting a depth of the input depth image 220 is described, it is only as an example, as alternative processes are also available, depending on embodiment. For example, in one or more embodiments, other applications of obtaining or providing/inputting a disparity map or a stereoscopic image may be implemented.

The input depth image 220 may include a depth value of a point, pixel, or grouping of pixels for example, matching a point, pixel, or grouping of pixels, also as only an example, of the input color image 210. The depth value may refer to information to be used to generate a 3D image. In this instance, excessive provision or expression of such a depth to the user may result in visual fatigue. Conversely, the perceived reality of the 3D image may decrease due to a modest or limited expression of the depth.

Accordingly, a process of adjusting of one or more depths may be desired. As only an example, conventionally depths are adjusted without consideration of human visual perception characteristics.

According to one or more embodiments, the image processing apparatus 100 may analyze a contrast of the input color image 210 based on one or more human visual perception characteristics, and adaptively adjust the depth of the depth image 220 based on the analyzed perception based contrast.

The object separation unit 110 may separate an object region 221 from a background region included in the depth image 220. Such a process will be described in greater detail at least with reference to FIG. 3, which sets forth one or more embodiments.

Figure 3:
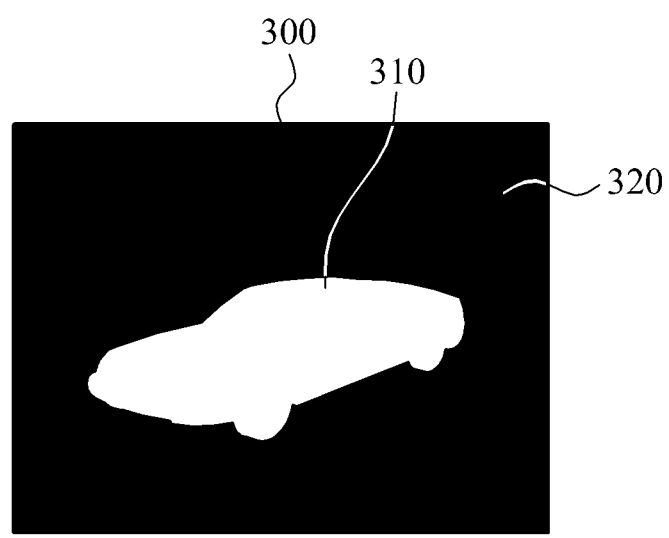
FIG. 3 illustrates a result of a separating of an object region from a background region, according to one or more embodiments.

FIG. 3 illustrates a result 300 of a separating of an object region from a background region, according to one or more embodiments.

An object region 310 may be construed as a foreground region, depending on embodiment. A plurality of such object regions 310 may be provided depending on content of an underlying image including the one or more object regions 310. In this instance, a representative object region may be selected from among the plurality of object regions, based on a point of view of a user, a movement of an object, a size of the object, and the like, for example. According to one or more embodiments, image processing to be described later may be performed with additional consideration being given each of to the plurality of object regions.

The object separation unit 110 of FIG. 1 may separate the object region 310 from a background region 320, using various schemes.

In one or more embodiments, the object separation unit 110 may distinguish a background from an object using a generated visual attention map, generated based on human visual perception characteristics. In one or more embodiments, the object separation unit 110 may perform a region segmentation using a predetermined Region of Interest (ROI) or an ROI determined in real time. In one or more embodiments, the object separation unit 110 may determine pixels of the object of the underlying image as having an estimated depth, estimated based on depth information of a depth image, such as the depth image 220 of FIG. 2, as only an example.

As only an example, the pixels at the estimated depth may be separated from the depth image 220. In order to accurately separate pixels of a background at a depth similar to the depth of the object, a plane equation representing a horizontal plane may be obtained. The object may be separated from the background accurately using the plane equation.

Various pre-processing and/or post-processing known processes may be added or alternatively included to separate the object region 310 from the background region 320. There are well-known schemes for separating an object region from a background region of an image, respectively implemented depending on embodiments, so further detailed description of the same will be omitted for conciseness.

A result of the separating of the object region 310 from the background region 320 by the object separation unit 110 may be a mask map of an identical scale, for example, such as shown in the result 300 of FIG. 3, and such a mask map may then be stored, depending on embodiment. This process will be further described with reference to FIG. 4.

FIG. 4 illustrates a process of separating an object region from a background region and storing the object region and the background region in a buffer 400, such as a buffer included in object separation unit 110 of FIG. 1, according to one or more embodiments. Here, FIG. 4 will be described with reference to the buffer 400, noting that such a buffer 400 is referred to as only an example, as alternate embodiments are available.

Referring to FIG. 4, in the buffer 400, a digital value of "1" may be stored with respect to the object region 310, and a digital value of "0" may be stored with respect to the background region 320. Here, digital values of binary data stored in the buffer 400 may also be set in reverse, i.e., a digital value "1" may be stored with respect to the background region 320 and a digital value "0" may be stored with respect to the object region 310. As only a example, here, the mask map described with respect to FIG. 3 may be populated with digital values "1" and "0" identifying representative depths of the object region and the background region.

According to one or more embodiments, such 1-bit binary data stored in the buffer 400 may represent a single pixel, i.e., representing at a pixel level, of the input color image 210 or the input depth image 220.

However, binary data stored in the buffer 400 is not limited to representing only such depth information at the pixel level. For example, in order to increase an image processing rate or for other purposes, a particular 1-bit binary data stored in the buffer 400 may represent a plurality of pixels of the input color image 210 or the input depth image 220. As only an example, pixels of an image may be grouped in block units, and information regarding whether each block corresponds to the object region 310 or the background region 320 may be stored in the buffer 400. In addition, depending on embodiment, such binary data stored in the buffer 400 may represent depth information at a sub-pixel level.

The result of separating the object region 310 from the background region 320 may be used for determining a representative depth value of the object region 310. In addition, the result may be used as basic information to be used for calculating a contrast between the object region 310 and the background region 320, such as for information of the extents of each region.

Figure 5:
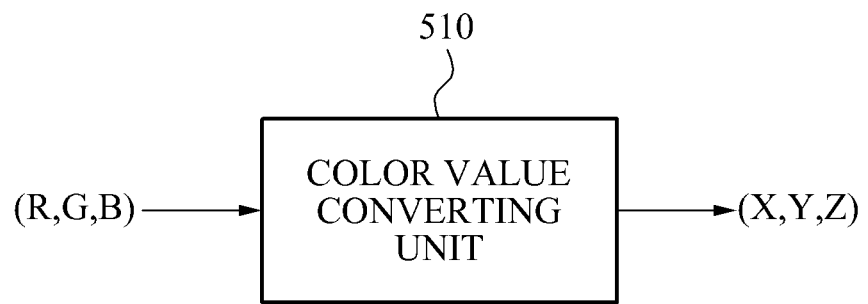
FIG. 5 illustrates a color value conversion process, according to one or more embodiments.

FIG. 5 illustrates a color conversion process, according to one or more embodiments. Here, FIG. 5 will be described with reference to a color value converting unit 510 performing a color value conversion, noting that such a color value converting unit 510 is referred to as only an example, as alternate embodiments are available.

Referring to FIG. 5, the color value converting unit 510 may derive color values of X, Y, and Z, by performing a color value conversion with respect to color values of pixels of an image, i.e., pixels that may be classified into the object region 310 or the background region 320, using the below Equation 1, for example.

$$y = y1 + (y2-y2) \times (x-x1)/(x2-x1) \quad \text{Equation 1:}$$

In Equation 1, a Piecewise Linear Interpolation assuming Constant Chromaticity coordinates (PLCC) model may be used for the X, Y, and Z conversion, as only an example.

The PLCC model may convert input values of R, G, and B, e.g., of an RGB color space, into values of X, Y, and Z, e.g., of an XYZ color space, using pre-measured values reflecting a display characteristic associated with the image processing apparatus 100 of FIG. 1, or of a display when the image processing apparatus 100 is the display.

At least a portion of the measured values may correspond to values to be used by measuring the display characteristic. In an embodiment, and only as an example, a correlation between the values of X, Y, and Z measured at 15 scale step intervals, e.g., in a scale range from "0" to "255", and black values of R, G, and B may be measured.

The value of Y calculated by the foregoing process may be associated with a luminance value. Referring to FIG. 3, by comparing a luminance value representing the object region 310 to a luminance value representing the background region 320, a contrast between the object region 310 and the background region 320 may be calculated. In one or more embodiments, and as only an example, a luminance value representing a region may correspond to an average value of luminance values of the region. In one or more embodiments, again as only an example, the luminance value representing the region may be determined based on a distribution frequency for each luminance value.

Figure 6:
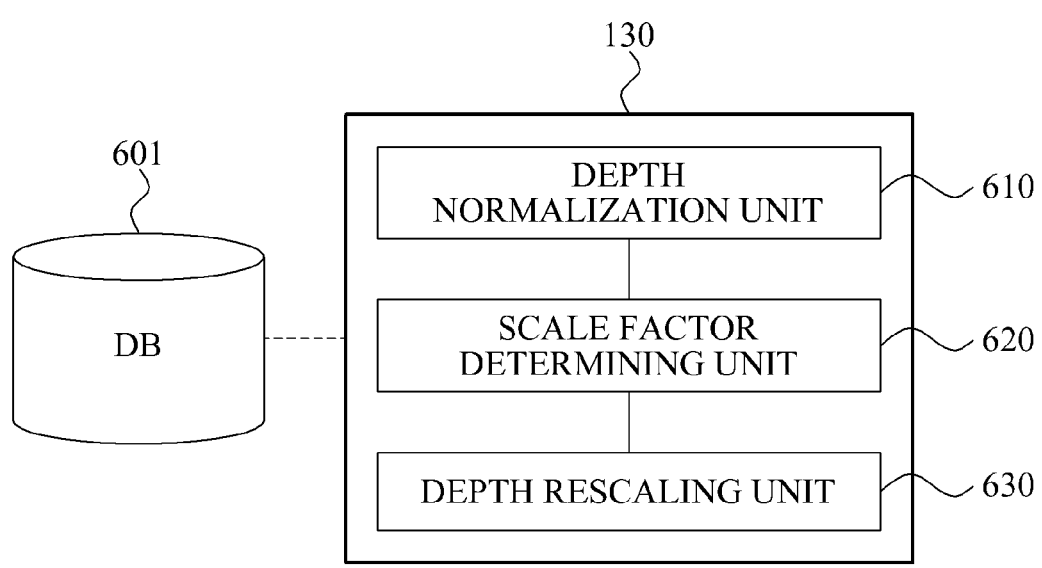
FIG. 6 illustrates a configuration of a depth adjusting unit, according to one or more embodiments.

FIG. 6 illustrates a configuration of a depth adjusting unit 130, such as the depth adjusting unit 130 of FIG. 1 as only an example, according to one or more embodiments.

The depth adjusting unit 130 may include a depth normalization unit 610.

The depth normalization unit 610 may normalize a depth of an input image, using a disparity and/or a maximum depth to be displayed by a display, e.g., such as a particular known display with particular display characteristics, associated with the image processing apparatus 100 of FIG. 1, as a reference value.

Since maximum depths to be displayed by displays may differ from one another, based on a hardware characteristic or a calibration level, such a depth normalization process may be performed.

When the depth normalization is performed, a scale factor determining unit 620 may determine a scale factor for rescaling the normalized depth using a contrast, e.g., calculated by the contrast calculating unit 120 of FIG. 1, between an object region and a background region.

The contrast calculating unit 120 may calculate the contrast, using a representative luminance value of the object region and a representative luminance value of the background region, such as described with reference to FIG. 5, as follows.

Among the derived values of X, Y, and Z, e.g., as described with reference to FIG. 5 and depending on embodiment, the representative luminance value of the object region and the representative luminance value of the background region may be determined, using the value of Y corresponding to a luminance or a brightness.

As described above, depending on embodiment, the representative luminance value may be obtained using an average of values of Y of pixels included in a region, using a distribution frequency of the values of Y of the pixels, or based upon alternate considerations of the different luminance values.

The contrast calculating unit 120 may calculate the contrast, such as by using a method of calculating the Michelson contrast corresponding to a well-known contrast calculating method, as expressed by the below Equation 2, as only an example.

$$C_{michelson} = \frac{Y_{max} - Y_{min}}{Y_{max} + Y_{min}} \quad \text{Equation 2}$$

Referring to Equation 2, the Michelson contrast $C_{michelson}$ of an input image may be calculated using a greater value $Y_{max}$ and a smaller value $Y_{min}$ of a representative Y value of the object region and a representative Y value of the background region.

However, such a calculating method is provided as only as an example, as alternate approaches for calculating the contrast are also available, depending on embodiment.

The scale factor determining unit 620 may determine the scale factor, using the calculated contrast. Accordingly, the human visual perception characteristics may be reflected in the process of determining the scale factor.

From a point of view of psychophysics, a JND may refer to a minimum difference between stimuli distinguishable by a human or an animal.

The JND was first studied by Weber, and innumerable experiments have been conducted to measure a luminance value L and a JND ΔL of the luminance value L. As a result, a relationship, as expressed by the below Equation 3, may be derived, as only an example.

$$k_{weber} = \frac{\Delta L}{L} \qquad \text{Equation 3}$$

In Equation 3, a ratio between all luminance values L and JNDs ΔL of the luminance values L may be constant, as a constant k. Although the JNDs or the constant k may be changed depending on the luminance values L, validity of Equation 3 may still be recognized when an accuracy of a precise level is unnecessary, for example.

As a result of conducting theoretical and/or experimental research on a correlation between a luminance value and a depth value, a JND with respect to a depth value may be understood to decrease as a contrast corresponding to a difference between a luminance value of an object region and a luminance value of a background region increases. As only an example, it may be understood that sensitivity experienced by a human to a change in the depth value may increase as the contrast between the object region and the background region increases.

Based on such a determination, the scale factor determining unit 620 may determine a value of the scale factor for adjusting the depth so as to decrease as the contrast between the object region and the background region increases.

A mapping table and/or calculated data for determining the value of scale factor based on the calculated contrast may be stored in a database 601. Further, depending on embodiment, the database 601 may be stored in a storage and/or a memory included in the image processing apparatus 100 of FIG. 1, for example.

The calculated contrast may be determined to be included in one of a number of predetermined contrast levels.

In one or more embodiments, the scale factor determining unit 620 may predefine levels of potential contrast for characterizing a calculated contrast into one of number of groups, as only an example, a high contrast group, a middle contrast group, a low contrast group, no contrast that is negligible group, and the like, and may predetermine, e.g., different, scale factors corresponding to each of the groups, respectively.

In this instance, the scale factor determining unit 620 may characterize the object region as being one of such groups based on which group the contrast between the object region and the background region, e.g., as calculated by the contrast calculating unit 120, falls within, and determine and set a scale factor for the characterized group to be a final scale factor for adjusting the depth of the input image.

A depth rescaling unit 630 may adjust the depth of the input image e.g., as normalized during the normalization by the depth normalization unit 610, based on the determined final scale factor.

The depth rescaling unit 630 may adjust the depth value for a maximum depth value of the input image to correspond to the scale factor for adjusting the depth.

According to one or more embodiments, the depth value of the input depth image may be normalized. Accordingly, in this normalization, the depth may be adjusted by multiplying the normalized depth value by the scale factor, noting that normalization may not be included in all embodiments.

When the image is reconstructed based on the adjusted depth value, the contrast of the input image and the human visual perception characteristics may be reflected. Accordingly, quality deterioration may be minimized while a perceived depth is maintained, and an image producing little visual fatigue may be provided.

Reproduction of an image will now be described in greater detail with reference to FIG. 7.

Figure 7:
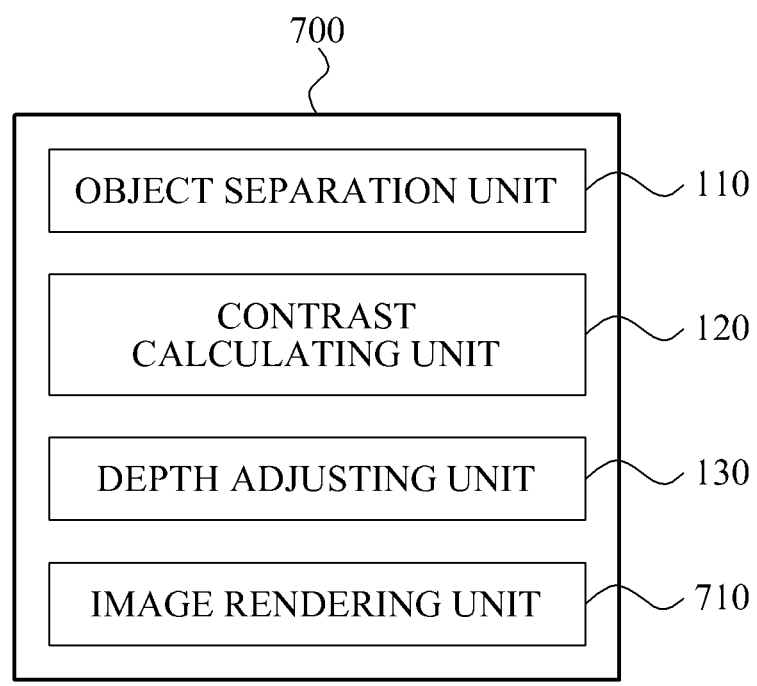
FIG. 7 illustrates an image processing apparatus, according to one or more embodiments.

FIG. 7 illustrates an image processing apparatus 700, according to one or more example embodiments. The image processing apparatus 700 may include an object separation unit, a contrast calculating unit, and a depth adjusting unit, such as the object separation unit 110, the contrast calculating unit 120, and the depth adjusting unit 130 described with reference to any of FIGS. 1 through 6, for example.

Referring to FIG. 7, the image processing apparatus 700 may further include an image rendering unit 710. In one or more embodiments, the image processing apparatus 700 may be a display, such as the image processing apparatus 100 of FIG. 1 may also be a display.

The image rendering unit 710 may render a 3D image, e.g., an image whose depth has been adjusted by the depth adjusting unit 130, for example.

In one or more embodiments, the image rendering unit 710 may render an image at a predetermined point of view, based on a reference image and a depth image including distance information corresponding to pixels in the reference image, using depth image based rendering (DIBR).

A process of rendering the image at the predetermined point of view using the DIBR may be understood through the below Equation 4, for example.

$$u_v = u_r + \beta \cdot d \qquad \text{Equation 4:}$$

In Equation 4, $u_v$ denotes a predetermined virtual view to be obtained, $u_r$ denotes an input, d denotes a depth, and β denotes a predetermined value which may be changeable for setting a view to be rendered.

In one or more embodiments, after an image is projected in a 3D space using a single reference image and depth information of a depth image, objects in a left image may next become moved to an observed right side, and objects in a right image may next become moved to an observed left side, based on respective depths, e.g., compared to an original color image from an original point of view. In this instance, a movement of an object, as only an example, a disparity, may be determined in proportion to a depth value.

FIG. 8 illustrates an image processing method, according to one or more embodiments.

Referring to FIG. 8, in operation 810, an input color image and an input depth image may be received. As described above, depending on embodiment, the input depth image may be replaced with various modifications, for example, another color image for a stereoscopic construction, a disparity map, and the like.

In operation 820, an object region may be separated from a background region using at least one of the input color image and the input depth image, for example.

The object region may be separated from the background region using various schemes, such as the example schemes described with reference to FIGS. 1 through 3, noting that alternatives are available.

In operation 831, color space values of the input image, e.g., RGB color space values, may be converted into color space values of X, Y, and Z in which a display characteristic is reflected, such as described above with reference to FIG. 5, as only an example.

In operation 832, a representative luminance value of the object region and a representative luminance value of the background region may each be calculated, and a contrast corresponding to a difference between the representative luminance value of the object region and the representative luminance value of the background region may be calculated. As only examples, various examples for calculating a contrast are described with reference to at least FIGS. 1, 5, and 6, and the like, noting that alternatives are also available, depending on embodiment.

In operation 833, a scale factor for the object region may be determined corresponding to the calculated contrast. As only examples, various examples for determining such a scale factor are described with reference to at least FIGS. 5 and 6, noting that alternatives are also available, depending on embodiment.

In operation 840, a representative depth value for the object region may be calculated. The representative depth value may be determined based on an average of depths included in the object region or may be determined in view of frequencies of depth values, such as described above with reference to FIG. 6, as only examples. Here, also as only an example, the representative depth value may now be set to represent the adjusted depth of the object region, e.g., the scale factor may be applied to the input depth values of the object region by applying the mask map described in FIG. 3.

In operation 842, the representative depth value may be normalized using a maximum depth value to be displayed by a display, again, such as described above with reference to FIG. 6, as only an example.

When the scale factor is determined, the normalized depth value may be rescaled based on the appropriate scale factor, in operation 850.

In operation 860, the 3D image may be rendered and reproduced using the adjusted depth along, such as the rescaled normalized depth value, and the reference image. In this instance, a 3D image at a predetermined point of view may be rendered.

According to one or more embodiments, the depth of an object of an image may be adaptively adjusted using a JND based on the contrast, among human visual perception characteristics. Accordingly, it is possible to reduce visual fatigue without causing quality deterioration or performing unnecessary adjustment of the depth.

Depending on embodiment, apparatuses, systems, and units descriptions herein may respectively include one or more hardware devices or hardware processing elements. For example, in one or more embodiments, any described apparatus, system, and unit may further include one or more desirable memories, and any desired hardware input/output transmission devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

For example, the units described herein may be implemented using hardware components, software components, or a combination thereof. As only example, a processing device may be instituted using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. Depending on embodiment, the processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring a processing device, for example, to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

In addition, one or more embodiments may include a method that is implemented through a non-transitory computer-readable media, e.g., including computer readable code or program instructions, to control one or more processing devices to implement a respective method, such as implementing a method using various operations embodied by a computer. Computer readable code may include both machine code, such as produced by a compiler, and files containing higher level code that may be executed by the computer using an interpreter, for example. Depending on embodiment, as only an example, the non-transitory computer-readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. The computer-readable medium may also be embodied in at least one application specific integrated circuit (ASIC) or Field Programmable Gate Array (FPGA), as only examples, which execute (processes like a processor) program instructions. The media may also be any defined, measurable, and tangible distributed network, so that the computer readable code is stored and executed in a distributed fashion. Still further, as only an example, the processing element could include a processor or a computer processor, and processing elements may be distributed and/or included in a single device. The processing element may be a specially designed computing device to implement one or more of the embodiments described herein. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image processing apparatus, comprising:
   an object separation unit configured to separate an object region from a background region based on at least one of a color image and a disparity map associated with the color image;
   a contrast calculating unit configured to calculate a contrast between the object region and the background region; and
   a depth adjusting unit configured to determine a scale factor based on the calculated contrast and scale a disparity value of the disparity map based on the scale factor, the scale factor being decreased as the contrast increases.

2. The image processing apparatus of claim 1, wherein the object region and the background are regions of the color image.

3. The image processing apparatus of claim 1, wherein the object separation unit is configured to generate a mask map based on the separating of the object region from the background region, and stores the mask map in a buffer.

4. The image processing apparatus of claim 3, wherein the mask map is populated with depth representing information of the object region.

5. The image processing apparatus of claim 4, wherein the depth adjusting unit is configured to adjust the disparity of the disparity map by applying a-ft scale factor to the disparity map using the mask map.

6. The image processing apparatus of claim 1, wherein the object separation unit is configured to separate the object region from the background region using a visual attention map generated based on human visual perception characteristics.

7. The image processing apparatus of claim 1, wherein the object separation unit is configured to separate the object region from the background region using a predetermined region of interest (ROI).

8. The image processing apparatus of claim 1, wherein the object separation unit is configured to separate the object region from the background region, by segmenting a level of a disparity value using the disparity map and remove a horizontal plane using an equation of the horizontal plane.

9. The image processing apparatus of claim 1, wherein the contrast calculating unit comprises:
   a color value converting unit configured to convert a color value of at least one pixel of the color image into a luminance value in which a display characteristic associated with the image processing apparatus is reflected.

10. The image processing apparatus of claim 9, wherein the image processing apparatus comprises a display and the display characteristics comprise physical display characteristics of the display.

11. The image processing apparatus of claim 9, wherein the color value converting unit is configured to respectively convert one or more color value of one or more pixels into respective luminance values, using a piecewise linear interpolation assuming constant chromaticity coordinates (PLCC) model.

12. The image processing apparatus of claim 11, wherein the contrast calculating unit is configured to calculate a first luminance value representing a luminance of the object region and a second luminance value representing a luminance value a luminance of the background region, based on the respective converted luminance values, and calculate the contrast based on a difference between the first luminance value and the second luminance value.

13. The image processing apparatus of claim 12, wherein the contrast calculating unit is configured to calculate the contrast by applying the first luminance value and the second luminance value to a determined Michelson contrast.

14. The image processing apparatus of claim 1, wherein the depth adjusting unit comprises:
   a depth normalization unit configured to normalize the disparity map, using a maximum depth value to be displayed by a display associated with the image processing apparatus.

15. The image processing apparatus of claim 14, wherein the image processing apparatus comprises the display.

16. The image processing apparatus of claim 14, wherein the scale factor is determined, using a database constructed by an experiment on a just noticeable difference (JND) with respect to a depth value.

17. The image processing apparatus of claim 14, wherein the scale factor determining unit is configured to determine which of predetermined contrast groupings the calculated contrast falls within, so the scale factor determining unit determines which of respectively different predetermined scale factors, set to be respectively applied for each of the predetermined contrast groupings, to apply to the disparity value.

18. The image processing apparatus of claim 1, further comprising:
   an image rendering unit configured to render a three-dimensional (3D) image corresponding to at least one point of view, using the color image and a result of the scaling of the disparity value of the disparity map by the depth adjusting unit.

19. The image processing apparatus of claim 18, wherein the image rendering unit is configured to render the 3D image using depth image based rendering (DIBR).

20. An image processing method, comprising:
   separating an object region from a background region using at least one of a color image and a disparity map associated with the color image;
   calculating a contrast between the object region and the background region
   determining a scale factor based on the calculated contrast, the scale factor being decreased as the contrast increases; and
   scaling a disparity value of the disparity map based on the determined scale factor.

21. The image processing method of claim 20, further comprising generating a mask map based on the separating of the object region from the background region, populating the mask map with depth representing information of the object region, and applying the scale factor, based on the calculated contrast, to the disparity map using the mask map.

22. The image processing method of claim 20, wherein the calculating of the contrast comprises respectively converting one or more color values of one or more pixels of the color image into respective luminance values in which a display characteristic associated with a display is reflected.

23. The image processing method of claim 22, wherein the converting of the color value comprises converting the color value of the at least one pixel into the luminance value based on a piecewise linear interpolation assuming constant chromaticity coordinates (PLCC) model, and the calculating of the contrast further comprises calculating a first luminance value representing a luminance of the object region and a second luminance value representing a luminance of the background region, based on the respective converted luminance values of the one or more pixels of the color image, and calculating the contrast based on a difference between the first luminance value and the second luminance value.

24. The image processing method of claim 20, further comprising:

normalizing the disparity map based on a maximum depth value to be displayed by a display.

25. The image processing method of claim 24, wherein the scale factor is determined using a database constructed by an experiment on a just noticeable difference (JND) with respect to a depth value.

26. A non-transitory computer-readable medium comprising computer readable code to control at least one processing device to implement an image processing method, the method comprising:

separating an object region from a background region based on at least one of a color image and a disparity map associated with the color image;

calculating a contrast between the object region and the background region;

determining a scale factor based on the calculated contrast; and scaling a disparity value of the disparity map based on the determined scale factor, the scale factor being decreased as the contrast increases.

* * * * *